(12) United States Patent  
Tun et al.

(10) Patent No.: US 9,007,537 B2  
(45) Date of Patent: Apr. 14, 2015

(54) CAPACITIVE TOUCH MODULE AND DISPLAY HAVING CAPACITIVE TOUCH MODULE

(75) Inventors: Kyaw Kyaw Tun, Hsin-Chu (TW); Chao-Chen Wang, Hsin-Chu (TW); Chi-Cheng Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 356 days.

(21) Appl. No.: 13/612,886

(22) Filed: Sep. 13, 2012

(65) Prior Publication Data

US 2013/0314623 A1   Nov. 28, 2013

(30) Foreign Application Priority Data

May 22, 2012   (TW) ............... 101118145 A (51) Int. Cl.  
    *G02F 1/1335* (2006.01)  
    *G06F 3/044* (2006.01)  
(52) U.S. Cl.  
    CPC ..................... *G06F 3/044* (2013.01)  
(58) Field of Classification Search  
    None  
    See application file for complete search history.

(56) References Cited

U.S. PATENT DOCUMENTS

2013/0208196 A1* 8/2013 Kim et al. ............... 349/15

FOREIGN PATENT DOCUMENTS

JP     2004272354     9/2004  
KR    1020090048183     5/2009

* cited by examiner

*Primary Examiner* — Richard Kim  
(74) *Attorney, Agent, or Firm* — Winston Hsu; Scott Margo (57) ABSTRACT

A capacitive touch module includes a first glass layer, a second glass layer, a liquid crystal layer, a first insulating layer, a second insulating layer, a plurality of first electrodes, second electrodes and third electrodes. The liquid crystal layer is arranged between the first glass layer and the second glass layer. The first insulating layer is formed between the first glass layer and the liquid crystal layer. The second insulating layer is formed between the liquid crystal layer and the second glass layer. The plurality of first electrodes are formed between the liquid crystal layer and the first insulating layer along a first axis. The plurality of second electrodes are formed between the second insulating layer and the second glass layer along the first axis. The plurality of third electrodes are formed between the first insulating layer and the first glass layer along a second axis.

10 Claims, 6 Drawing Sheets

FIG. 1A

The driving
signal of the
touch structure

FIG. 1B

The driving
signal of the
touch structure

The driving
signal of the
liquid crystal
structure

CAPACITIVE TOUCH MODULE AND DISPLAY HAVING CAPACITIVE TOUCH MODULE

BACKGROUND OF THE INVENTION

1. Field of the Invention

The present invention relates to a capacitive touch module, and more particularly to a capacitive touch module capable of generating three-dimensional (3D) images.

2. Description of the Related Art

Due to their slim shapes, low power dissipation and low radiation, liquid crystal displays (LCDs) are widely applied in mobile electronic devices such as notebooks, monitors, and smart-phones. Liquid crystal displays having touch input functions are also widely applied on more and more electronic devices as input interfaces. Touch displays include resistive type and capacitive type touch displays. Compared with the resistive type touch displays, the capacitive touch displays are capable of detecting multi-points touch inputs and can be operated in various ways. Besides, since 3D image applications are more and more popular, a display having both touch and 3D functions is needed.

Figure 1A:
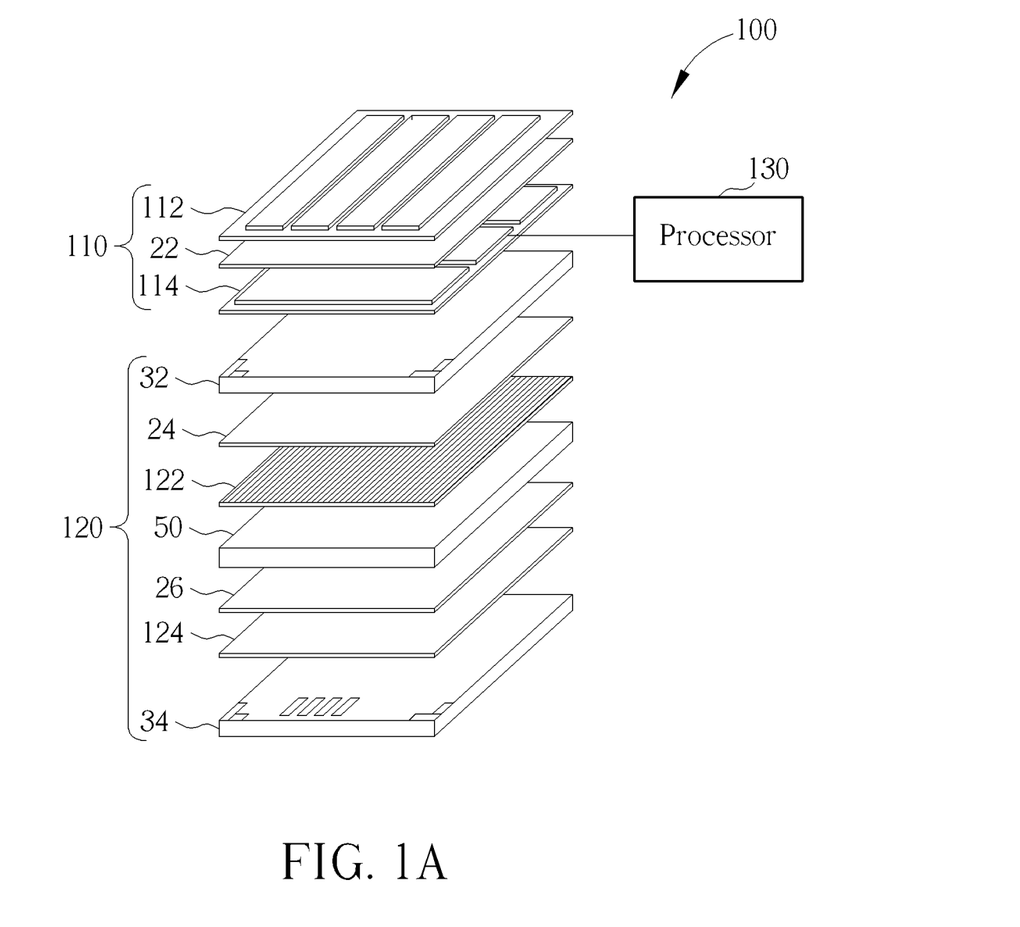
FIG. 1A shows a related art capacitive touch module in a touch display.

Please refer to FIG. 1A, which shows a related art capacitive touch module 100 in a touch display. As shown in FIG. 1A, the capacitive touch module 100 includes a touch structure 110, a touch structure 110, a liquid crystal structure 120 and a processor 130. The touch structure 110 includes a plurality of receiving electrodes 112, a first insulating layer 22 and a plurality of transmission electrodes 114. The first insulating layer 22 is formed between the plurality of receiving electrodes 112 and the plurality of transmission electrodes 114. When driving pulses are received by the transmission electrodes 114, the plurality of receiving electrodes 112 will generate touch signals according to how the capacitive touch module 100 is being touched, and then transmit the touch signals to the processor 130 of the capacitive touch module 100.

The liquid crystal structure 120 includes a first glass layer 32, a second glass layer 34, a liquid crystal layer 50, a second insulating layer 24, a third insulating layer 26, a plurality of first transparent electrodes 122 and a plurality of second transparent electrodes. The liquid crystal layer 50 is disposed between the first glass layer 32 and the second glass layer 34. The second insulating layer 24 is formed between the first glass layer 32 and the liquid crystal layer 50. The third insulating layer 26 is formed between the liquid crystal layer 50 and the second glass layer 34. The first transparent electrodes 122 are formed between the second insulating layer 24 and the liquid crystal layer 50. The second transparent electrodes 124 are formed between the third insulating layer 26 and the second glass layer 34. The first transparent electrodes 122 and the second transparent electrodes are used to respectively receive pulse signals having the same phase or different phases, thus the touch display can generate 3D images or two-dimensional (2d) images accordingly.

Figure 1B:
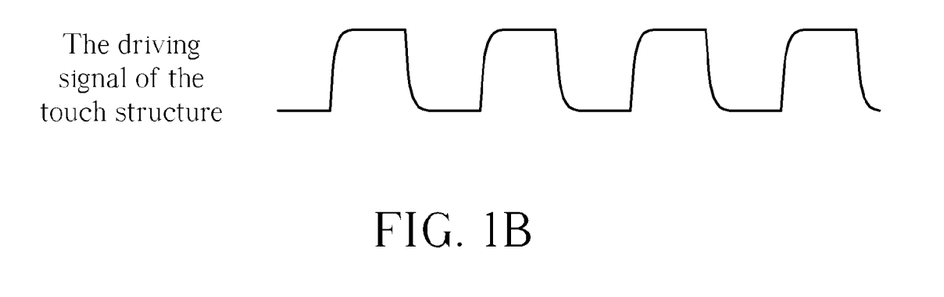
FIG. 1B shows the timing of driving signal of the touch structure in FIG. 1A.
Figure 1C:
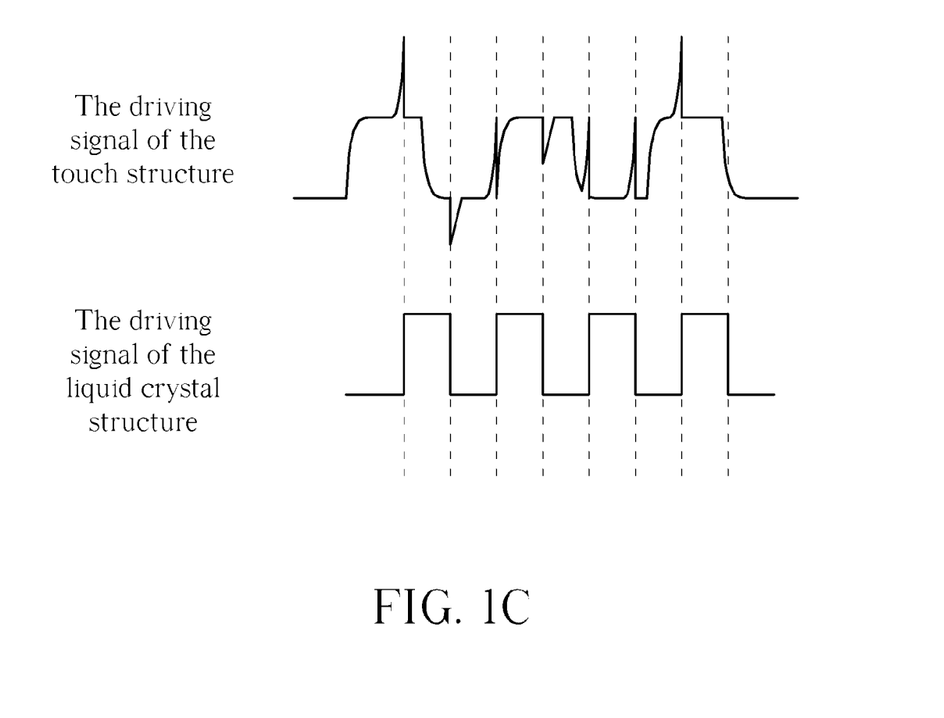
FIG. 1C is a timing diagram showing the touch signals in FIG. 1B being affected by the driving signal of the liquid crystal structure in FIG. 1A.

However, in the capacitive touch module 100, because the distance between the touch structure 110 and the liquid crystal structure 120 is too short, and the signals of the touch structure 110 and the liquid crystal structure 120 are not synchronous, the driving signal of the touch structure 110 and the liquid crystal structure 120 do not match but interfere each other. Please refer to FIGS. 1B and 1C. FIG. 1B shows the timing of driving signal of the touch structure 110 in FIG. 1A, and FIG. 1C is a timing diagram showing the touch signals in FIG. 1B being affected by the driving signal of the liquid crystal structure 120 in FIG. 1A. In FIG. 1B, the driving signal of the touch structure 110 is not affected yet, but in FIG. 1C, the distance between the touch structure 110 and the liquid crystal structure 120 is too short, and the signals of the touch structure 110 and the liquid crystal structure 120 are not synchronous, thus the driving signal of the touch structure 110 is dramatically distorted by interference. This causes the capacitive touch module 100 to not detect touch inputs correctly. Besides, if taking both of the touch function and the 2D/3D images switching function into account, the capacitive touch module 100 will have larger thickness and heavier weights, thus can not meet the requirement that the weights of the displays should be lighter and lighter, and the thickness of the displays should be thinner and thinner.

SUMMARY OF THE INVENTION

An embodiment of the present invention relates to a capacitive touch module comprising a first glass layer, a second glass layer, a liquid crystal layer, a first insulating layer, a second insulating layer, a plurality of first electrodes, second electrodes and third electrodes. The liquid crystal layer is arranged between the first glass layer and the second glass layer. The first insulating layer is formed between the first glass layer and the liquid crystal layer. The second insulating layer is formed between the liquid crystal layer and the second glass layer. The plurality of first electrodes are formed between the liquid crystal layer and the first insulating layer along a first axis. The plurality of second electrodes are formed between the second insulating layer and the second glass layer along the first axis. The plurality of third electrodes are formed between the first insulating layer and the first glass layer along a second axis. The first axis is perpendicular to the second axis.

Another embodiment of the present invention relates to a method of detecting position of a capacitive touch module being touched. The capacitive touch module comprises a first glass layer, a second glass layer, a liquid crystal layer arranged between the first glass layer and the second glass layer, a first insulating layer formed between the first glass layer and the liquid crystal layer, a second insulating layer formed between the liquid crystal layer and the second glass layer, a plurality of first electrodes formed between the liquid crystal layer and the first insulating layer along a first axis, a plurality of second electrodes formed between the second insulating layer and the second glass layer along the first axis and a plurality of third electrodes formed between the first insulating layer and the first glass layer along a second axis. The method comprises sequentially outputting a plurality of sets of first driving pulses to the first electrodes, sequentially outputting a plurality of sets of second driving pulses synchronous with the plurality of sets of the first driving pulses to the second electrodes, and detecting sensing signals outputted by the third electrodes when sequentially outputting the plurality of sets of the first driving pulses to the first electrodes and sequentially outputting the plurality of sets of the second driving pulses to the second electrodes. The first axis is perpendicular to the second axis.

Another embodiment of the present invention relates to a display. The display comprises a capacitive touch module and an image displaying layer. The capacitive touch module comprises a first glass layer, a second glass layer, a liquid crystal layer, a first insulating layer, a second insulating layer, a plurality of first electrodes, second electrodes and third electrodes, and a driving circuit. The liquid crystal layer is arranged between the first glass layer and the second glass layer. The first insulating layer is formed between the first glass layer and the liquid crystal layer. The second insulating layer is formed between the liquid crystal layer and the second glass layer. The plurality of first electrodes are formed between the liquid crystal layer and the first insulating layer along a first axis. The plurality of second electrodes are formed between the second insulating layer and the second glass layer along the first axis. The plurality of third electrodes are formed between the first insulating layer and the first glass layer along a second axis. The driving circuit is coupled to the first electrodes and the second electrodes, for sequentially outputting a plurality of sets of first driving pulses to the first electrodes and sequentially outputting a plurality of sets of second driving pulses synchronous with the first driving pulses to the second electrodes. The first axis is perpendicular to the second axis. The image displaying layer is disposed at a side of the second glass layer for displaying images.

These and other objectives of the present invention will no doubt become obvious to those of ordinary skill in the art after reading the following detailed description of the preferred embodiment that is illustrated in the various figures and drawings.

DETAILED DESCRIPTION

Some phrases are referring to specific elements in the present specification and claims, please notice that the manufacturer might use different terms to refer to the same elements. However, the definition between elements is based on their functions instead of their names. Further, in the present specification and claims, the term "comprising" is open type and should not be viewed as the term "consisted of." Besides, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means.

The embodiments and figures are provided as follows in order to illustrate the present invention in detail, but please notice that the claimed scope of the present invention is not limited by the provided embodiments and figures.

Figure 2:
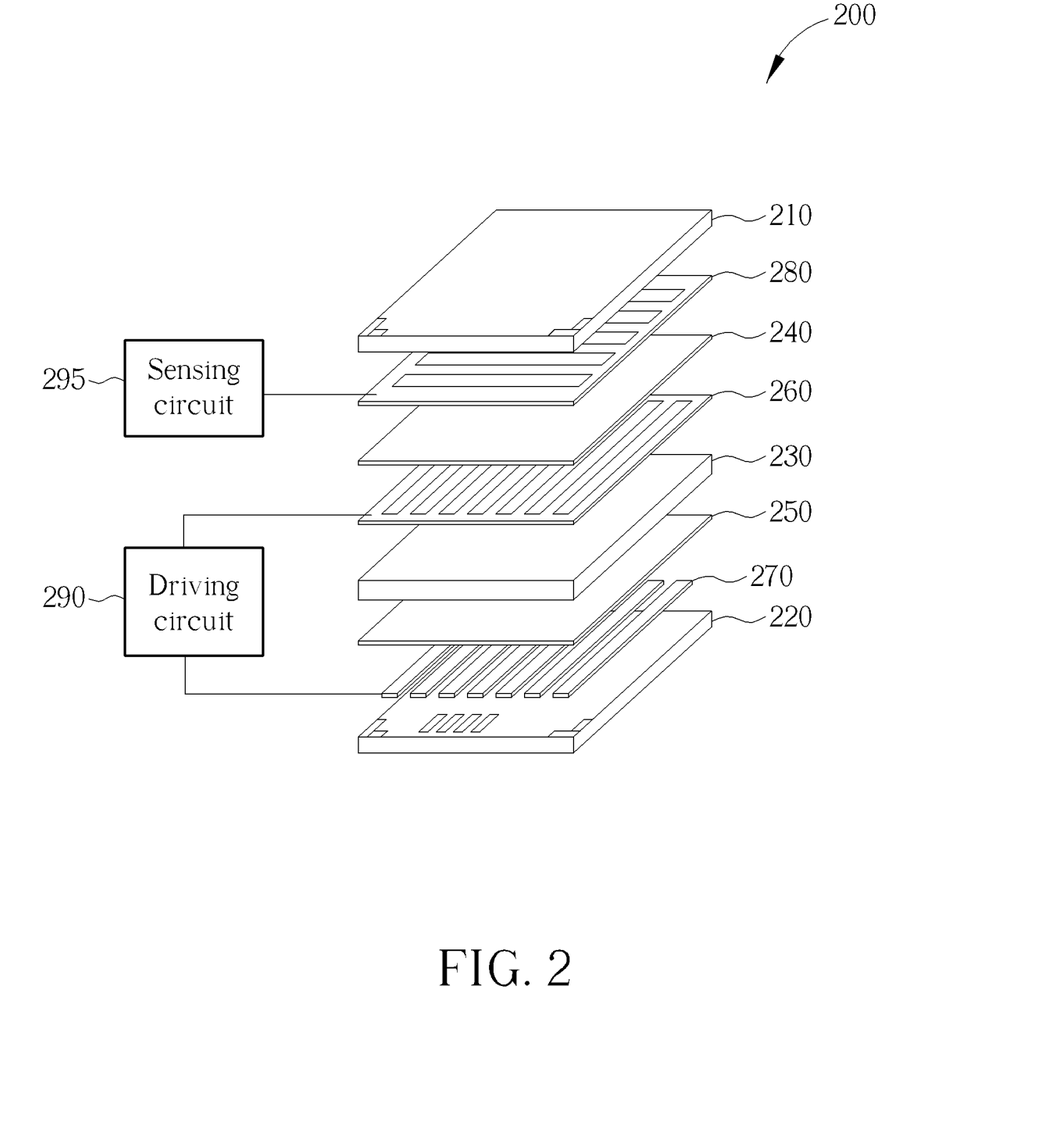
FIG. 2 shows a capacitive touch module of the present invention.

Please refer to FIG. 2, which shows a capacitive touch module 200 of the present invention. As shown in FIG. 2, the capacitive touch module 200 includes a first glass layer 210, a second glass layer 220, a liquid crystal layer 230, a first insulating layer 240, a second insulating layer 250, a plurality of first electrodes 260, a plurality of second electrodes 270, a plurality of third electrodes 280, a driving circuit 290 and a sensing circuit 295. The liquid crystal layer 230 is arranged between the first glass layer 210 and the second glass layer 220. The first insulating layer 240 is formed between the first glass layer 210 and the liquid crystal layer 230. The second insulating layer 250 is formed between the liquid crystal layer 230 and the second glass layer 220. The plurality of first electrodes 260 are formed between the liquid crystal layer 230 and the first insulating layer 240 along a first axis. The plurality of second electrodes 270 are formed between the second insulating layer 250 and the second glass layer 220 along the first axis. The plurality of third electrodes 280 are formed between the first insulating layer 240 and the first glass layer 210 along a second axis. In this embodiment, the first axis is configured perpendicular to the second axis. The third electrodes 280 are used to process the touch signals transmitted from the first glass layer 210, and the sensing circuit 295 is coupled to the third electrodes 280 for detecting the sensing signals outputted from the third electrodes 280. For example, when a user substantially touches the first glass layer with his\her fingers, the charge value of the third electrodes 280 will change corresponding to the positions of the first glass layer being touched. This makes the third electrodes generate sensing signals accordingly, and to output the sensing signals to the sensing circuit 295.

Although in this embodiment, the positions of elements as the first glass layer 210, the second glass layer 220, the first insulating layer 240, the second insulating layer 250, and etc. are configured as depicted in FIG. 2, the present invention does not limit arrangement of those elements of the capacitive touch module 200. For example, the third electrodes 280 can be configured bonding to the first glass layer 220 or to the first insulating layer 240, and the third electrodes 280 can be also configured to be formed on the first glass layer 220 or on the first insulating layer 240. Similarly, the first electrodes 260 and the second electrodes 270 are not limited to the configuration in FIG. 2.

Figure 3:
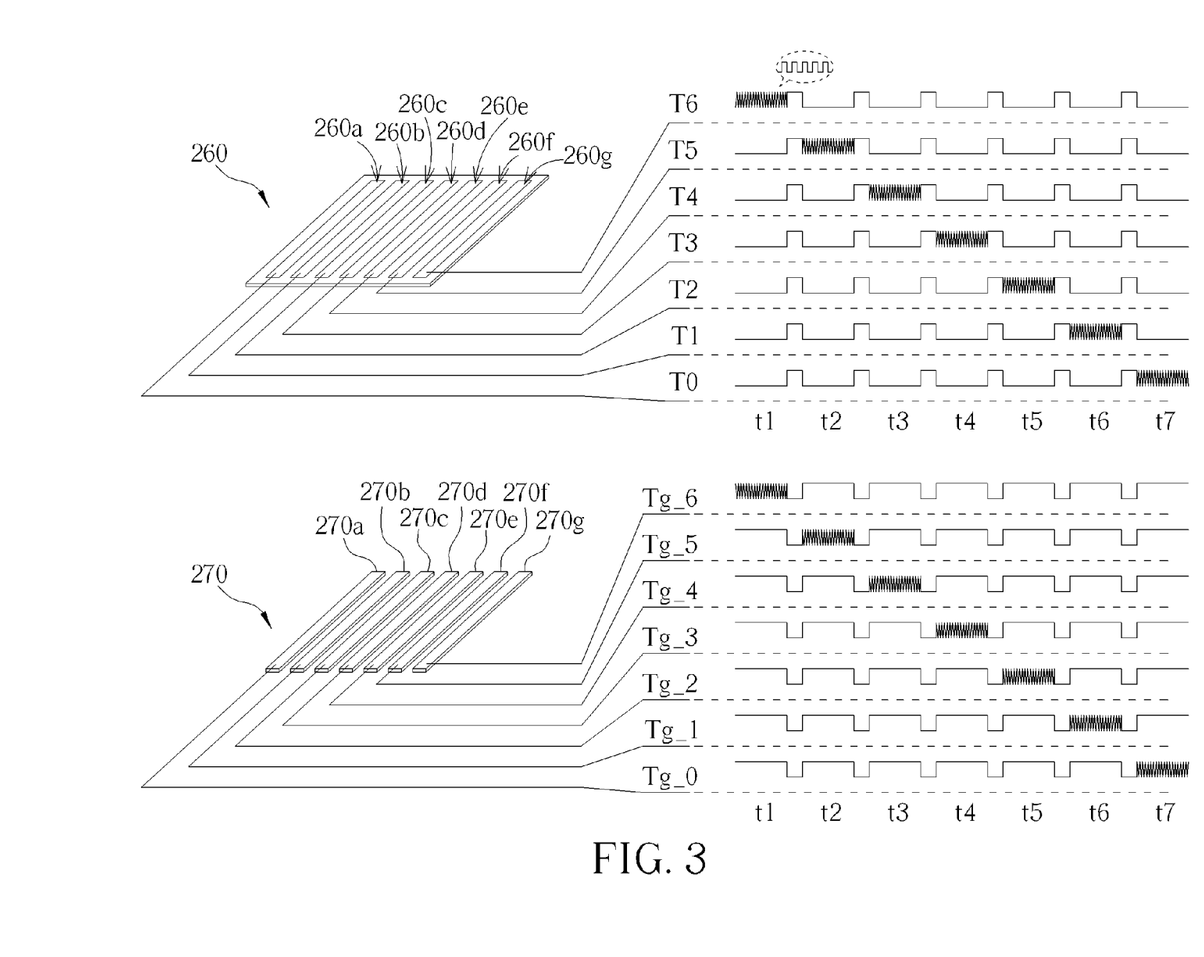
FIG. 3 shows a driving circuit outputting first driving signals and second driving signals to the capacitive touch module according to the first embodiment of the present invention.

Please refer to FIG. 3, which shows the driving circuit 290 outputting first driving signals T6 to T0 and second driving signals Tg_6 to Tg_0 to the capacitive touch module 200 according to the first embodiment of the present invention. The plurality of first electrodes 260 and the plurality of second electrodes 270 are used to make the display applying the capacitive touch module 200 display 3D images or 2D image signals according to the first driving signals T6 to T0 and the second driving signals Tg_6 to Tg_0, respectively. As shown in FIG. 3, the driving circuit 290 outputs the first driving signals T6 to T0 to the first electrodes 260g to 260a, respectively, and outputs the second driving signals Tg_6 to Tg_0 to the second electrodes 270g to 270a, respectively. Besides, the driving circuit 290 also outputs the first driving signals T6 to T0 to the third electrodes 280 (not shown in FIG. 3). The first driving signals T6 to T0 and the second driving signals Tg_6 to Tg_0 are synchronous and logically inversed and are transmitted to the first electrodes and the second electrodes, respectively, to generate 3D images on a display applying the touch module 200. In the period t1, the first driving signal T6 and the second driving signal Tg_6 are both high frequency driving pulses and logically inversed, and the first driving signals T5 to T0 and the second driving signals Tg_5 to Tg_0 are logically inversed. Besides, in the period t2, the first driving signal T5 and the second driving signal Tg_5 are both high frequency driving pulses and logically inversed, and the first driving signals T6, T4 to T0 and the second driving signals Tg_6, Tg_4 to Tg_0 are logically inversed. Similarly, in the period t7, the first driving signal T0 and the second driving signal Tg_0 are both high frequency driving pulses and logically inversed, and the first driving signals T6 to T1 and the second driving signals Tg_6 to Tg_1 are logically inversed.

Since the first driving signals T6 to T0 and the second driving signals Tg_6 to Tg_0 are logically inversed, the display applying the capacitive touch module 200 can display two sets of images which do not overlap each other, that is, images having 3D effects. Users can watch 3D images through receiving two sets of images which do not overlap each other with his/her left eye and right eye, respectively. According to the design of the display, users can watch 3D images with polarized 3D glasses or with the naked eye. The present invention does not limit the way users receive 3D images.

Because the first electrodes 260g to 260a and the third electrodes 280 are both driven by the first driving signals T6 to the T0, the problem that the signals of the touch structure 110 and the signals of the liquid crystal structure 120 are not synchronous in the related art capacitive touch module 100 can be avoided, thus the capacitive touch module 200 can correctly sense touch inputs.

Figure 4:
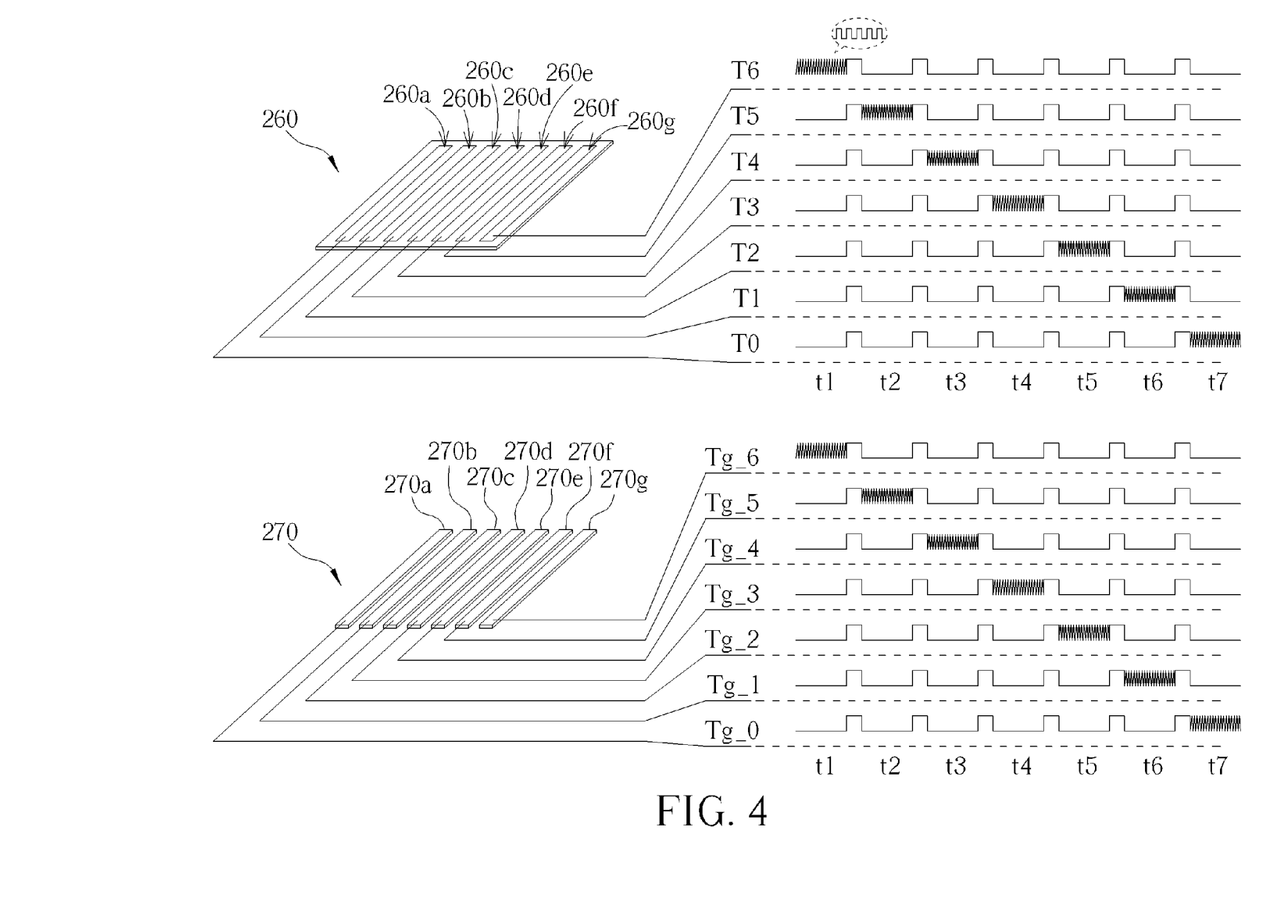
FIG. 4 shows a driving circuit outputting the first driving signals and the second driving signals to the capacitive touch module according to the second embodiment of the present invention.
Figure 5:
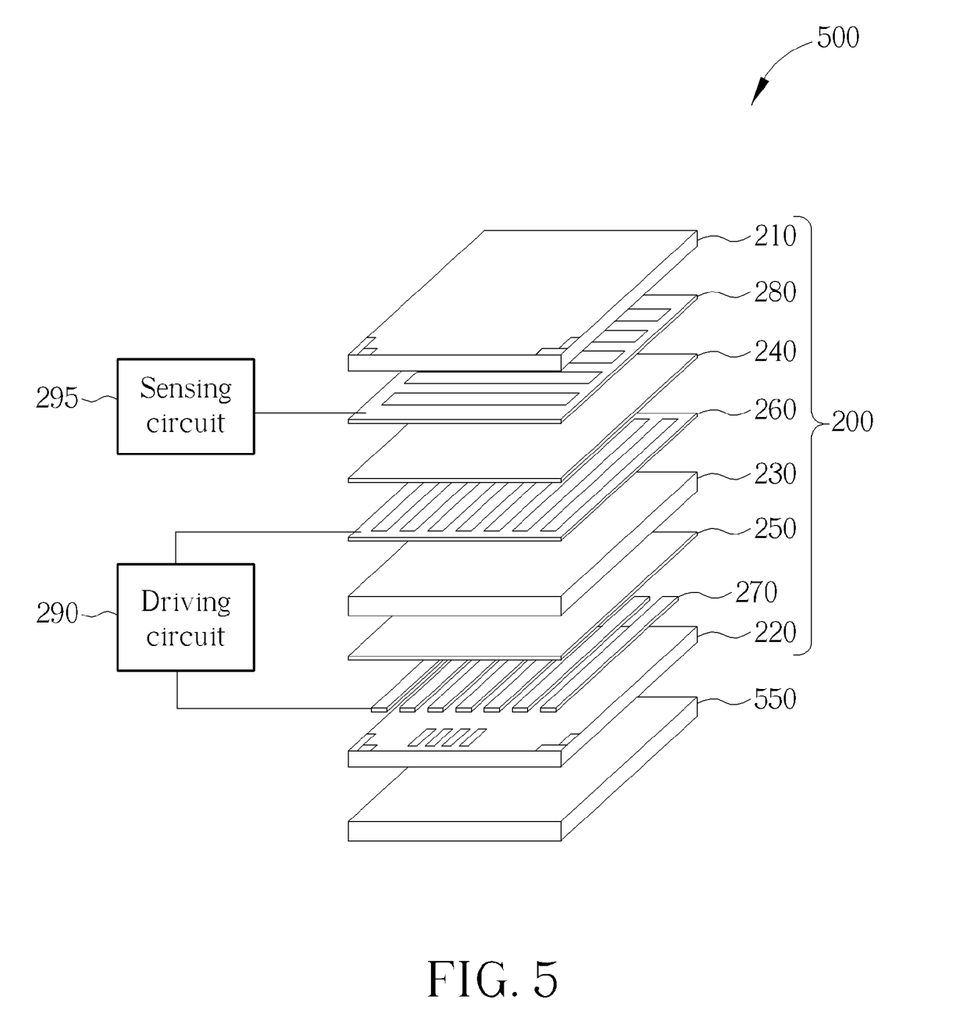
FIG. 5 shows a touch display including the capacitive touch panel in FIG. 2 according to the third embodiment of the present invention.

Please refer to FIG. 4, which shows the driving circuit 290 outputting the first driving signals T6 to T0 and the second driving signals Tg_6 to Tg_0. As shown in FIG. 5, a difference between the second embodiment and the first embodiment is that in the second embodiment, the first driving signals T6 to T0 outputted to the first electrodes 260g to 260a and the second driving signals Tg_6 to Tg_0 outputted to the second electrodes 270g to 270a are synchronous and in-phase to make the display applying the capacitive touch module 200 capable of displaying 2D images. That is, the first driving signals T6 to T0 and the second driving signals Tg_6 to Tg_0 are logically the same.

In the period t1, the first driving signal T6 and the second driving signal Tg_6 are both high frequency driving pulses and logically the same, and the first driving signals T5 to T0 and the second driving signals Tg_5 to Tg_0 are logically the same. In the period t2, the first driving signal T5 and the second driving signal Tg_5 are both high frequency driving pulses and logically the same, and the first driving signals T6, T4 to T0 and the second driving signals Tg_6, Tg_4 to Tg_0 are logically the same. Similarly, in the period t7, the first driving signal T0 and the second driving signal Tg_0 are both high frequency driving pulses and logically the same, and the first driving signals T6 to T1 and the second driving signals Tg_6 to Tg_1 are logically the same.

Since the first driving signals T6 to T0 and the second driving signals Tg_6 to Tg_0 are logically the same, the display applying the capacitive touch module 200 can display 2D images instead of 3D images.

In both of the first and second embodiments, the first driving signals T6 to T0 can be also outputted to the third electrodes 280 to drive the third electrodes 280. Besides, whether the first driving signals T6 to T0 outputted to the first electrodes 260g to 260a and the second driving signals Tg_6 to Tg_0 outputted to the second electrodes 270g to 270a are logically inversed or the same, the capacitive touch module 200 can detect the sensing signals outputted from the third electrodes 280 when the first driving signals T6 to T0 are received by the first electrodes 260g to 260a and the second driving signals Tg_6 to Tg_0 are received by the second electrodes 270g to 270a, to response according to the touch inputs made to the capacitive touch module 200.

Please refer to FIG. 5, which shows a touch display 500 including the capacitive touch panel 200 in FIG. 2 according to the third embodiment of the present invention. As shown in FIG. 5, the touch display 500 includes the capacitive touch module 200 and an image displaying layer 550. The touch display 500 is configured to show 2D or 3D images according to the signals received by the driving circuit 290, and then the image displaying layer will display images correspondingly. When the touch display 500 is displaying 3D images, the operation is as shown in FIG. 3, that is, outputting the first driving signals T6 to T0 to the first electrodes 260g to 260a and outputting the second driving signals Tg_6 to Tg_0 inversed to the first driving signals T6 to T0 to the second electrodes 270g to 270a. When the touch display 500 is displaying 2D images, the operation is as shown in FIG. 4, that is, outputting the first driving signals T6 to T0 to the first electrodes 260g to 260a and outputting the second driving signals Tg_6 to Tg_0 in-phase to the first driving signals T6 to T0 to the second electrodes 270g to 270a. Therefore, the touch display 500 has both functions of displaying 3D images and displaying 2D images.

In the present embodiment, the image displaying layer 550 can be any devices for displaying images and is not limited to be one specific element. For example, the image displaying layer 550 can be liquid crystals light emitting diodes (LEDs), or organic light emitting diodes (OLEDs).

Similarly, although for one skilled in the art to easily understand, in the touch display of the third embodiment, the positions of elements such as the third electrodes 280, the first glass layer 210, the second glass layer 220, the first insulating layer 240, the second insulating layer 250, and etc., are configured as depicted in FIG. 5, however, the present invention does not limit the arrangement of those elements. For example, the third electrodes 280 can be configured bonding to the first glass layer 220 or to the first insulating layer 240, and the third electrodes 280 can be also configured to be formed on the first glass layer 220 or on the first insulating layer 240. Similarly, the first electrodes 260 and the second electrodes 270 are not limited to the configuration in FIG. 5. Besides, because the touch display 500 includes the capacitive touch module 200, the problem of the related art capacitive touch module 100 in that the signals of the touch structure 110 and the liquid crystal structure 120 are not synchronous resulting in incorrect sensing can be avoided.

Through the devices and methods provided in the first embodiment to the third embodiment, the capacitive touch module 200 integrates both the touch input and the 3D image displaying functions. Because the first electrodes 260, the second electrodes 270 and the third electrodes 280 are all configured at the same side of the first glass layer 210, the sensing signals of the third electrodes 280 match the first driving signals T6 to T0 on the first electrodes 260 and the second diving signals Tg_6 to Tg_0 on the second electrodes 270, and will not interfere with each other. Besides, compared with the related art, the capacitive touch module 200 of the present invention is lighter and thinner, thus it is more convenient for users and its application is wider. Further, in the first embodiment to the third embodiment, the first electrodes 260g to 260a and the third electrodes 280 are both driven by the first driving signals T6 to T0, thus the problem of the related art capacitive touch module 100 in that the signals of the touch structure 110 and the liquid crystal structure 120 are not synchronous resulting in incorrect sensing can be avoided.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A capacitive touch module comprising
    a first glass layer;
    a second glass layer;
    a liquid crystal layer arranged between the first glass layer and the second glass layer;
    a first insulating layer formed between the first glass layer and the liquid crystal layer;
    a second insulating layer formed between the liquid crystal layer and the second glass layer;
    a plurality of first electrodes formed between the liquid crystal layer and the first insulating layer along a first axis;
    a plurality of second electrodes formed between the second insulating layer and the second glass layer along the first axis; and
    a plurality of third electrodes formed between the first insulating layer and the first glass layer along a second axis;
    wherein the first axis is perpendicular to the second axis.

2. The capacitive touch module of claim 1, further comprising a sensing circuit coupled to the third electrodes, for detecting sensing signals outputted by the third electrodes.

3. The capacitive touch module of claim 1, further comprising a driving circuit, coupled to the first electrodes and the second electrodes, for sequentially outputting a plurality of sets of first driving pulses to the first electrodes and sequentially outputting a plurality of sets of second driving pulses synchronous with the plurality of sets of first driving pulses to the second electrodes.

4. The capacitive touch module of claim 3, further comprising a sensing circuit coupled to the third electrodes, for detecting sensing signals outputted by the third electrodes.

5. The capacitive touch module of claim 3, wherein phases of the plurality of sets of the first driving pulses are logically inversed relative to phases of the plurality of sets of the second driving pulses.

6. The capacitive touch module of claim 3, wherein phases of the plurality of sets of the first driving pulses are logically the same as phases of the plurality of sets of the second driving pulses.

7. A display comprising:
    a capacitive touch module comprising:
        a first glass layer;
        a second glass layer;
        a liquid crystal layer arranged between the first glass layer and the second glass layer;
        a first insulation layer formed between the first glass layer and the liquid crystal layer;
        a second insulation layer formed between the liquid crystal layer and the second glass layer;
        a plurality of first electrodes formed between the liquid crystal layer and the first insulation layer along a first axis;
        a plurality of second electrodes formed between the second insulation layer and the second glass layer along the first axis;
        a plurality of third electrodes formed between the first insulation layer and the first glass layer along a second axis; and
        a driving circuit coupled to the first electrodes and the second electrodes, for sequentially outputting a plurality of sets of first driving pulses to the first electrodes and sequentially outputting a plurality of sets of second driving pulses synchronous with the first driving pulses to the second electrodes; and
    an image displaying layer, disposed at a side of the second glass layer, for displaying images;
    wherein the first axis is perpendicular to the second axis.

8. The display of claim 7, wherein the capacitive touch module further comprises a sensing circuit coupled to the third electrodes for detecting sensing signals outputted by the third electrodes.

9. The display of claim 7, wherein phases of the plurality of sets of the first driving pulses are logically inversed relative to phases of the plurality of sets of the second driving pulses.

10. The display of claim 7, wherein phases of the plurality of sets of the first driving pulses are logically the same as phases of the plurality of sets of the second driving pulses.

* * * * *